United States Patent
Li et al.

(10) Patent No.: US 7,856,178 B2
(45) Date of Patent: Dec. 21, 2010

(54) SYSTEM FOR COMPENSATING CAMERA MOVEMENT AND A CALIBRATION METHOD THEREOF

(75) Inventors: Yun-Chin Li, Banciao (TW); Chin-Lung Yang, Toufen Township, Miaoli County (TW); Shih-Chang Han, Taipei (TW)

(73) Assignee: Altek Corporation, Hsinchu (TW)

( * ) Notice: Subject to any disclaimer, the term of this patent is extended or adjusted under 35 U.S.C. 154(b) by 173 days.

(21) Appl. No.: 12/232,933

(22) Filed: Sep. 26, 2008

(65) Prior Publication Data

US 2009/0103910 A1 Apr. 23, 2009

(30) Foreign Application Priority Data

Oct. 19, 2007 (TW) .............................. 96139166 A

(51) Int. Cl.
*G03B 17/00* (2006.01)
*H04N 5/228* (2006.01)
(52) U.S. Cl. .................................... 396/55; 348/208.99
(58) Field of Classification Search .................. 396/55; 348/208.99, 208.1, 208.2, 208.4, 208.5, 208.6, 348/208.7
See application file for complete search history.

(56) References Cited

U.S. PATENT DOCUMENTS

| 7,509,038 | B2 * | 3/2009 | Poon et al. | 396/52 |
| 2006/0170782 | A1 * | 8/2006 | Stavely | 348/208.6 |
| 2008/0239084 | A1 * | 10/2008 | Endo | 348/208.4 |
| 2008/0284859 | A1 * | 11/2008 | Lee | 348/208.1 |
| 2008/0309772 | A1 * | 12/2008 | Ikeda | 348/208.7 |
| 2009/0059017 | A1 * | 3/2009 | Kurokawa | 348/208.1 |
| 2009/0207259 | A1 * | 8/2009 | Ito et al. | 348/208.4 |

\* cited by examiner

*Primary Examiner*—Rodney E Fuller
(74) *Attorney, Agent, or Firm*—Rosenberg, Klein & Lee

(57) ABSTRACT

A method for compensating camera movement solves the problem of the captured image becoming blurred due to involuntary camera movement in the following way. Firstly, a camera with a look-up table is provided. Next, after a trigger signal is received, the camera movement and the environmental brightness are detected to generate a movement value and a brightness index. A compensation mode and a set of parameters that correspond to the movement value and the brightness index are selected from the look-up table. Finally, when an image-capturing signal is received, the movement compensation modules of the camera are driven by referring to the compensation mode and the parameters to capture a sharp image in a best mode.

12 Claims, 3 Drawing Sheets

SYSTEM FOR COMPENSATING CAMERA MOVEMENT AND A CALIBRATION METHOD THEREOF

BACKGROUND OF THE INVENTION

1. Field of the Invention

The present invention relates to a system and method for compensating camera movement. In particular, this invention relates to a system and method for compensating camera movement and a calibration method that uses a look-up table to obtain the compensation mode and the parameters.

2. Description of the Related Art

Image stabilization for digital still cameras is an important research topic. Some methods of movement compensation or image correction can solve the problem of the captured image being blurred due to camera movement when images are taken at low illumination levels.

There are two main movement-compensating methods, including the photo system compensation and the electronic system compensation. The photo system compensation compensates the movement of the camera via the movement compensation of the lens or sensing elements to stabilize the light shaft. The electronic system compensation uses the electronic system of the camera to control the capturing process, uses software to perform a calculation and recover the image. Alternatively, the camera continuously captures the images and automatically selects a sharp image from these captured images.

The acceptable longest camera exposure time (the safe exposure time) for the user to capture a sharp picture is between $1/30$ s and $1/60$ s when the focal length of the mounted lens is approximate 35 mm. The system for compensating camera movement usually can prolong the safe exposure time with two to three stages. However, the system for compensating camera movement has its limitation. When the camera movement exceeds the compensation limitation, the camera movement cannot be compensated.

SUMMARY OF THE INVENTION

One particular aspect of the present invention is to provide a system and a method for compensating camera movement that builds a look-up table in the camera by a calibration process. When the user uses the camera to take a picture, a compensation mode and a parameter are selected from the look-up table according to the detected camera movement and the brightness. The compensation limitation problem of the prior art is overcome, and the camera movement is compensated.

The present invention solves the problem of the captured image becoming blurred due to involuntary camera movement in the following way. Firstly, a camera with a look-up table is provided. Next, after a trigger signal is received, the camera movement and the environmental brightness are detected to generate a movement value and a brightness index. A compensation mode and a set of parameters that correspond to the movement value and the brightness index are selected from the look-up table. Finally, when an image-capturing signal is received, a plurality of movement compensation modules of the camera is driven by referring to the compensation mode and the corresponding control/tuning parameters to capture an external image.

The present invention also discloses a system for compensating camera movement that is located inside a camera. The system for compensating camera movement includes a plurality of movement compensation modules, an environment detecting module, a memory module, and a process/control module. The environment detecting module detects the camera movement and the environmental brightness to output a movement value and a brightness index. The memory module is used to store a look-up table. The process/control module is coupled with the movement compensation modules, the environment detecting module and the memory module for receiving the movement value and the brightness index, searches the look-up table according to the movement value and the brightness index to select a compensation mode and the corresponding set of control parameters, and drives the movement compensation modules to capture an external image by referring to the compensation mode and the set of parameters.

The present invention also discloses a calibration method for a camera for building a look-up table. First, an environment is provided so that the camera detects a movement value and a brightness index. Next, under the given environment, a plurality of compensation modes and parameters are used for driving a plurality of movement compensation modules of the camera to capture a plurality of images. A specific image is selected from the images. Finally, the compensation mode and the parameters that correspond to the specific image are recorded on the look-up table according to the movement value and the brightness index.

For further understanding of the invention, reference is made to the following detailed description illustrating the embodiments and examples of the invention. The description is only for illustrating the invention and is not intended to limit the scope of the claim.

BRIEF DESCRIPTION OF THE DRAWINGS

The drawings included herein provide a further understanding of the invention.

A brief introduction of the drawings is as follows.

DETAILED DESCRIPTION OF THE PREFERRED EMBODIMENTS

The camera used in the present invention has a plurality of movement compensation modules. The compensation modes and the parameters used for controlling the movement compensation modules are built in a look-up table. When the camera is used for capturing a picture, the detected movement value and the brightness are used as the destination index to find out the corresponding compensation mode and control parameters from the look-up table to drive the movement compensation modules to capture the image.

Figure 1:
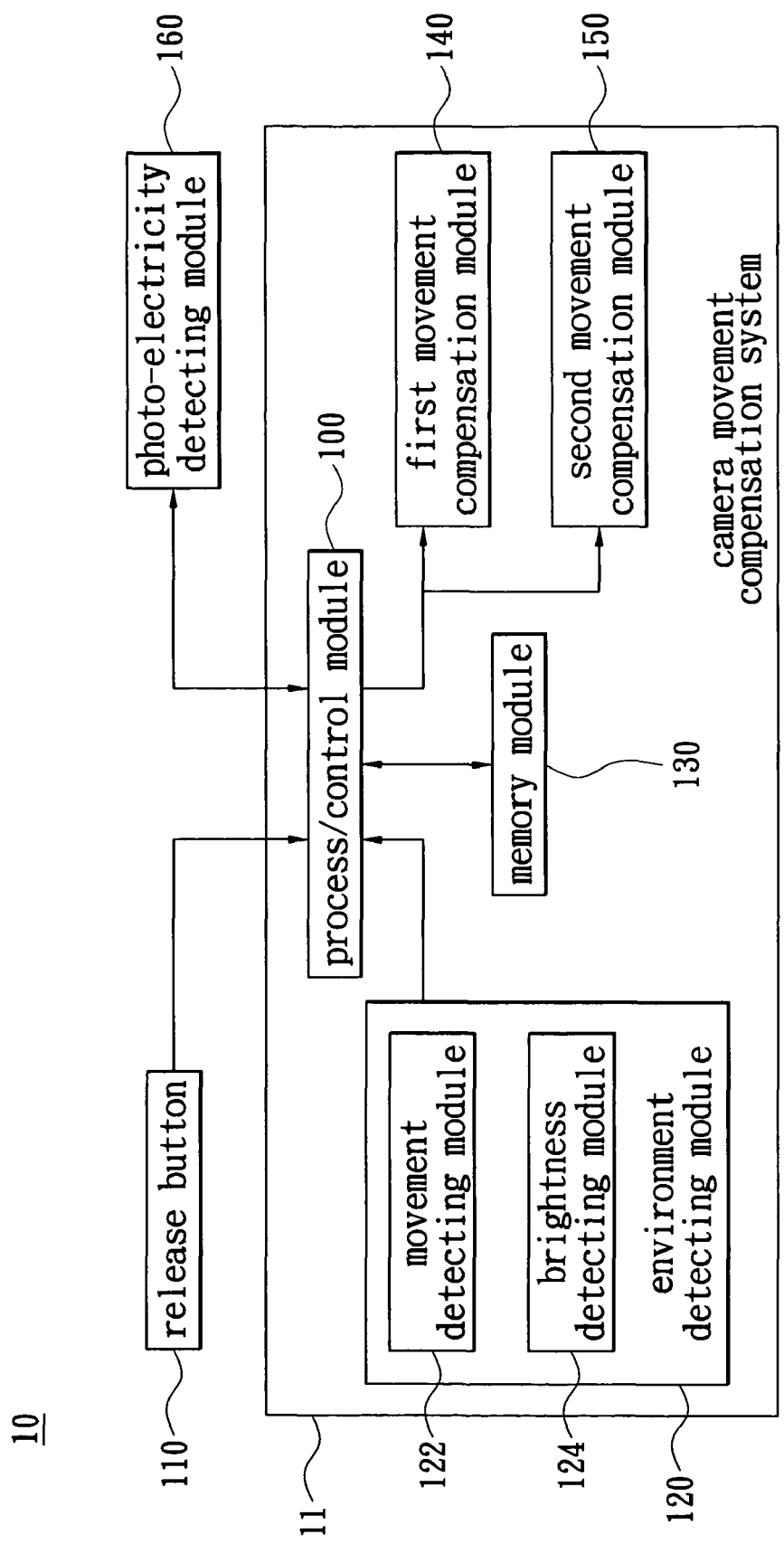
FIG. 1 is a schematic diagram of the system for compensating camera movement of the present invention.

Reference is made to FIG. 1, which shows a schematic diagram of the system for compensating camera movement of the present invention. The camera has a camera movement compensation system 11. The camera movement compensation system 11 includes a process/control module 100, an environment detecting module 120 coupled with the process/control module 100, a memory module 130, a first movement compensation module 140, and a second movement compensation module 150. The camera further has a release button 110 and a photo-electricity detecting module 160 respectively coupled with the process/control module 100.

The process/control module 100 is a control and logic calculation core of the camera 10. The release button 110 is pressed by the user to control the process/control module 100 to perform the image-capturing process to capture an external image. The photo-electricity detecting module 160 uses the CCD or CMOS image-sensing element to capture the image. The release button 110 is a two-stage button structure. When the user softly presses the release button 110, the first-stage button of the release button 110 is enabled to generate a trigger signal and send the trigger signal to the process/control module 100 to start the sensitizing and focusing functions, etc. When the user continuously presses the release button 110, the second-stage button of the release button 110 is enabled to generate an imaging-capturing signal and send the imaging-capturing signal to the process/control module 100 to open the camera shutter to cooperate with the photo-electricity detecting module 160 to capture the image. The sensitizing and focusing technology of the camera is the prior art, and is not repeated here.

The environment detecting module 120 has a movement detecting unit 122 and a brightness detecting unit 124. The movement detecting unit has a movement sensor for detecting the movement of the camera 10 to generate a movement value. The brightness detecting unit 124 has a brightness sensor for detecting the environmental brightness of the camera 10 to generate a brightness index. The movement sensor can be a rotation sensor (also called as angle velocity sensor), or an inertia sensor (also called as an acceleration sensor). The brightness sensor is a photo-sensitivity resistor. Alternatively, the image captured by the photo-electricity detecting module 160 is used for evaluating the environmental brightness. The brightness detecting unit 124 can be also derived from the image capturing sensor directly. The memory module 130 is a non-volatile memory in the camera 10 for storing the firmware, the product information, and the calibration parameters.

The first movement compensation module 140 and the second movement compensation module 150 use different technologies to compensate the camera movement. In this embodiment, two movement compensation modules are used as an example to illustrate the concept of the present invention. The quantity of the movement compensation module is not used to limit the scope of the present invention.

In one embodiment, the first movement compensation module 140 and the second movement compensation module 150 are a photo compensation system and an electronic compensation system. The photo compensation system is that the lens or the photo-sensing element of the camera 10 performs movement compensation according to the movement direction. The electronic compensation system is that the process/control module 100 controls the camera shutter speed, the diaphragm and the sensitivity to adjust the image exposure value. In this embodiment, when the environmental brightness is low and the camera movement is within the compensation allowable value, only the photo compensation system is enabled to compensate the movement. When the camera movement exceeds the compensation allowable value, both the photo compensation system and the electronic compensation system are enabled. In addition to the mechanism movement compensation, a means for increasing the sensitivity is used to increase the image exposure value to prevent the image from being blurred.

The present invention uses a calibration process to find out the best compensation mode and the control parameters for different environmental brightness and the camera movement to drive one or some of the movement compensation algorithms to compensate the camera movement. Thereby, a sharp and low-noise image is captured. The compensation mode and the parameter for different camera movement and the environmental brightness are recorded in a look-up table and are stored in the camera 10. Therefore, when the release button 110 is enabled to output a trigger signal, the detected movement value and the brightness value are used as the destination index to obtain the corresponding compensation mode and the parameters. One or a combination of the first movement compensation module 140 and the second movement compensation module 150 are driven to cooperate with the photo-electricity detecting module 160 to capture the sharp image in a best compensation mode.

Figure 2:
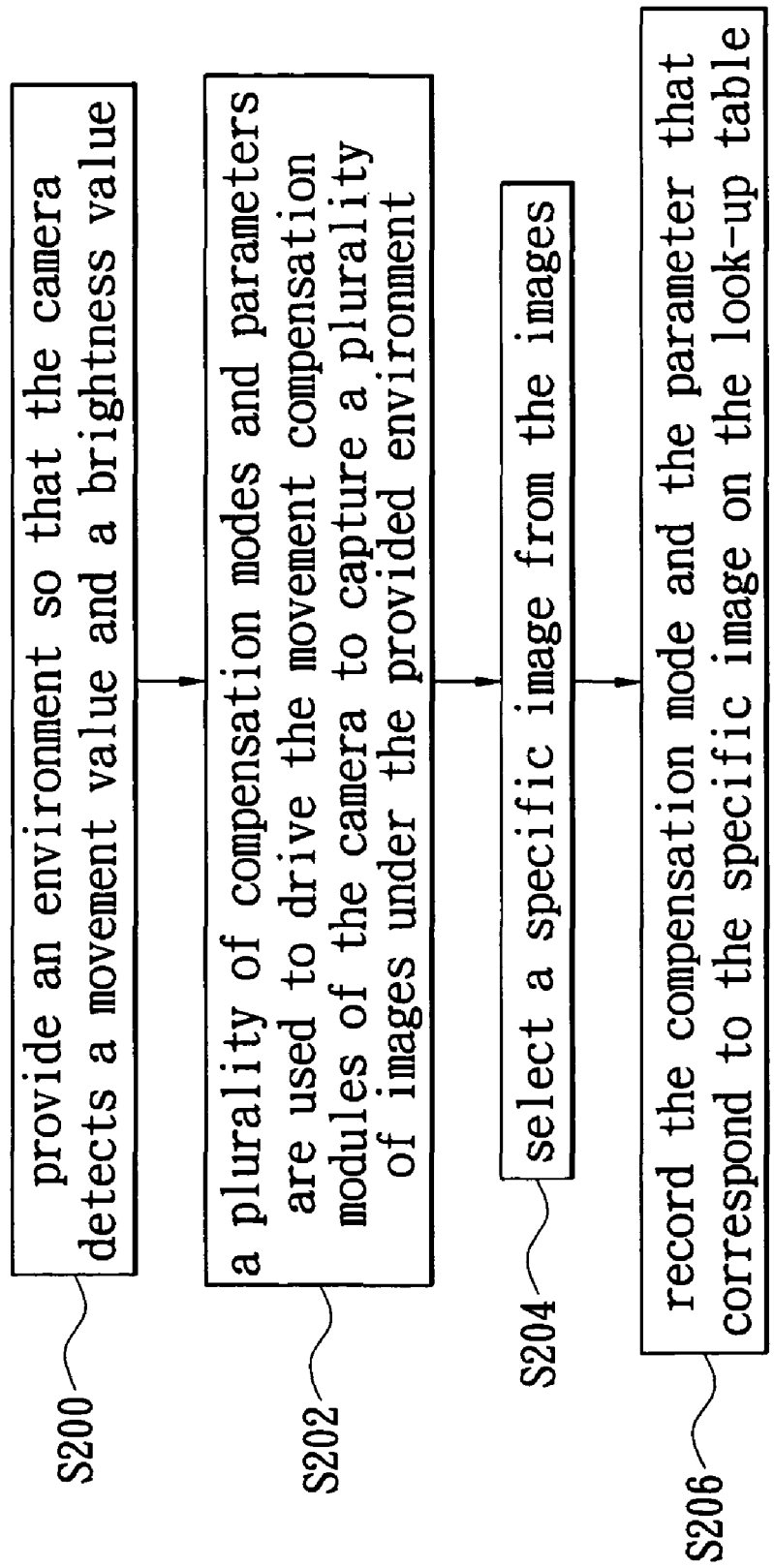
FIG. 2 is a flow chart of the calibration method for a camera of the present invention.

Reference is made to FIG. 2, which shows a flow chart of the calibration method for a camera of the present invention. The calibration method is used for building the look-up table. The related system is referred to FIG. 1. The calibration method includes the following steps.

First, an environment is provided so that the environment detecting module 120 of the camera 10 detects a movement value and a brightness value (S200).

Next, under the given environment, a plurality of compensation modes and parameters are used for driving both or one of the first movement compensation module 140 and the second movement compensation module 150 of the camera 10 to cooperate with the photo-electricity detecting module 160 to capture a plurality of images (S202).

A specific image is selected from the captured images (S204).

Finally, the compensation mode and the parameters that correspond to the specific image are recorded on the look-up table according to the movement value and the brightness value (S206).

This means that when the camera 10 detects the movement value and the brightness value, the camera 10 uses the compensation mode and the parameter to drive the first movement compensation module 140 and the second movement compensation module 150 to capture the sharp image.

Next, another environment is given so that the camera detects a second movement value and/or a second brightness value and the steps S202-S206 are repeated. Thereby, the best compensation mode and parameters that correspond to the second movement value and the second brightness value are recorded in the look-up table. The above procedure is repeated until the look-up table is finished, and is stored in the memory module 130.

Generally, the calibration procedure is finished in the production process by a computer system. The environment can be generated by the chamber, the test equipment and the fixtures so that the environment detecting module 120 can detect the expected movement value and the brightness value. In one embodiment, the steps S200~S206 are implemented by the camera 10 and an external computer system to perform the procedures, including detecting the movement value and the brightness value, changing the compensation mode and the parameters, controlling to capture the image, and building the look-up table, etc.

The step S204 is to select the best quality image from the captured images to be the specific image by an artificial method or a software computation in the computer system.

Therefore, the process/control module 100 receives the detected movement value and the brightness value and searches the corresponding compensation mode and parameter from the look-up table in the memory module 130. Then, the process/control module 100 uses the selected compensation mode and the corresponding parameters to drive the first movement compensation module 140 and the second movement compensation module 150 to cooperate with the photo-electricity detecting module 160 to capture the image.

Figure 3:
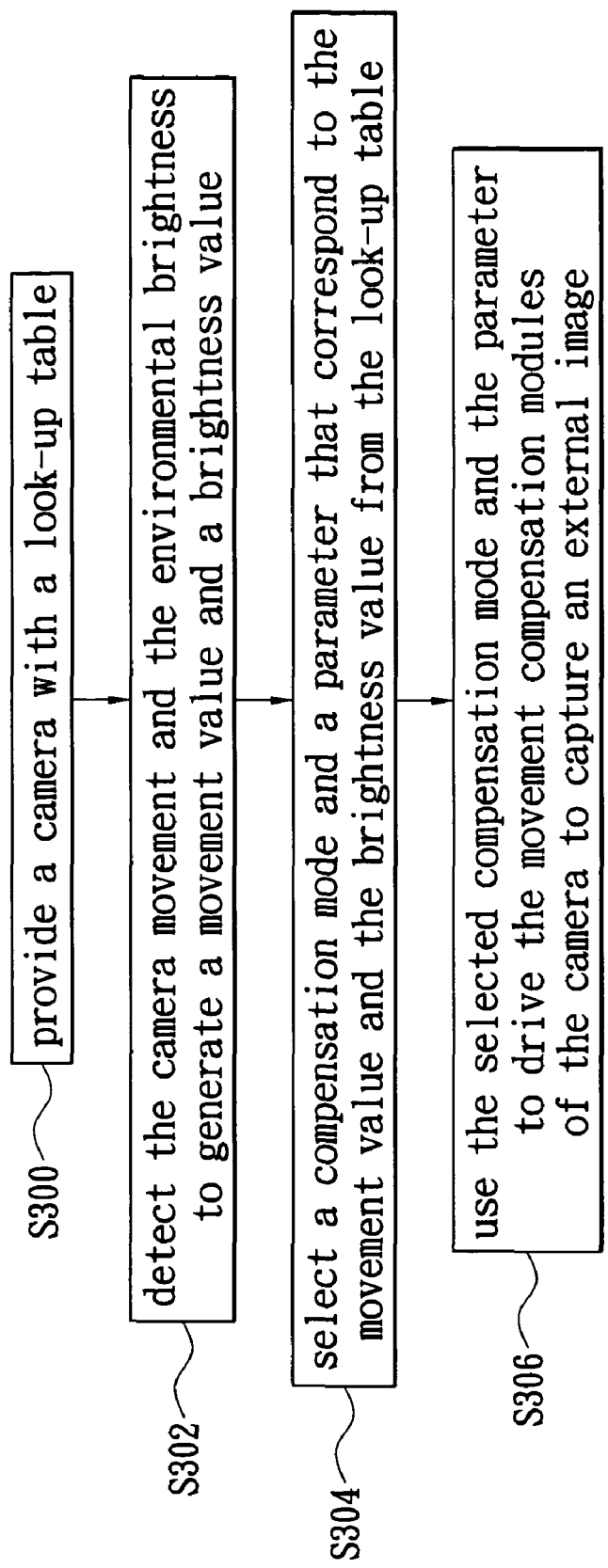
FIG. 3 is a flow chart of the method for compensating camera movement of the present invention.

Reference is made to FIG. 3, which shows a flow chart of the method for compensating camera movement of the present invention. The related system is referred to FIG. 1. The method for compensating camera movement includes the following steps.

Firstly, a camera with a look-up table is provided (S300).

Next, after the process/control module 100 receives a trigger output signal from the release button 110, the process/control module 100 controls the environment detecting module 120 to detect the movement of the camera 10 to generate a movement value, and detects the brightness around the camera 10 to generate a brightness value (S302).

The process/control module 100 searches the look-up table according to the movement value and the brightness value to select the corresponding compensation mode and the parameter (S304).

Finally, when the process/control module 100 receives an image-capturing signal outputted from the release button, the selected compensation mode and the parameter is used to drive the first movement compensation module 140 and the second movement compensation module 150 to cooperate with the photo-electricity detecting module 160 to capture the image (S306).

The system and the method for compensating camera movement and a calibration method record the compensation modes and the parameters for different movement values and the brightness values in the look-up table by a calibration procedure and store the look-up table in the camera. When the user uses the camera to take a picture, a compensation mode and a set of parameters are selected from the look-up table according to the detected camera movement and the brightness to drive the movement compensation modules. Thereby, the camera movement is compensated. Moreover, by using the look-up table to obtain the compensation mode and the parameters for controlling the movement compensation modules, the calculation resource of the camera will not be occupied, and the efficiency is enhanced.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A method for compensating a camera movement, solving the problem of a captured image becoming blurred due to the camera movement, comprising:
   providing a camera with a look-up table;
   detecting the camera movement and an environmental brightness to generate a movement value and a brightness index after a trigger signal is received;
   selecting a compensation mode and a set of parameters that correspond to the movement value and the brightness index from the look-up table; and
   driving a plurality of movement compensation modules of the camera to capture an external image when an image-capturing signal is received, in which the movement compensation modules employ a photo compensation system and an electronic compensation system to compensate the camera movement;
   wherein the electronic compensation system controls a sensitivity, a camera shutter speed, and a diaphragm of the camera; and the photo compensation system includes a lens or a photo-sensing element of the camera configured to move in a direction that is opposite to that associated with the camera movement.

2. The method for compensating the camera movement as claimed in claim 1, wherein the compensation mode drives one or a combination of the movement compensation modules to capture the external image.

3. A calibration method for a camera, for building a look-up table, comprising:
   providing a first environment so that the camera detects a movement value and a brightness index;
   using a plurality of compensation modes and parameters to drive the movement compensation modules of the camera to capture a plurality of images under the first environment, in which the movement compensation modules employs a photo compensation system including a lens or a photo-sensing element of the camera configured to move in a direction opposite to that associated with a camera movement and an electronic compensation system for controlling a sensitivity, a camera shutter speed, and a diaphragm of the camera;
   selecting a specific image from the images; and
   recording the compensation mode and the parameters that correspond to the specific image on the look-up table associated with the movement value and the brightness index.

4. The calibration method for the camera as claimed in claim 3, further comprising: providing a second environment so that the camera detects a second movement value and/or a second brightness index; and repeating using the compensation modes and the parameters to drive the movement compensation modules of the camera to capture a plurality of images under the second environment.

5. The calibration method for the camera as claimed in claim 3, wherein the compensation modes drive one or a combination of the movement compensation modules to capture the image.

6. A system for compensating a camera movement, located inside a camera, comprising:
   a plurality of movement compensation modules having a photo compensation system and an electronic compensation system;
   an environment detecting module for detecting the camera movement and an environmental brightness to output a movement value and a brightness index;
   a memory module storing a look-up table; and
   a process/control module coupled with the movement compensation modules, the environment detecting module, and the memory module, for receiving the movement value and the brightness index, searching the look-up table according to the movement value and the brightness index to select a compensation mode and a set of parameters, and driving the movement compensation modules to capture an external image by referring to the compensation mode and the parameters;
   wherein the electronic compensation system controls a sensitivity, a camera shutter speed, and a diaphragm of the camera, and the photo compensation system includes a lens or a photo-sensing element of the camera configured to move in a direction opposite to that associated with the camera movement.

7. The system for compensating camera movement as claimed in claim 6, wherein the environment detecting module comprises: a movement detecting unit having a movement sensor for detecting the camera movement, and converting the camera movement into the movement value and outputting the movement value to the process/control module, and a brightness detecting module having a brightness sensor for detecting the brightness around the camera, and converting the brightness into the brightness index and outputting the brightness index to the process/control module.

8. The system for compensating camera movement as claimed in claim 7, wherein the movement sensor is a rotation sensor (an angle velocity sensor), or an inertia sensor (an acceleration sensor).

9. The system for compensating camera movement as claimed in claim 6, wherein the compensation mode drives one or a combination of the movement compensation modules to capture the external image.

10. The system for compensating camera movement as claimed in claim 6, wherein the camera has a release button coupled with the process/control module, the release button being enabled externally to generate a trigger signal and an image-capturing signal.

11. The system for compensating camera movement as claimed in claim 10, wherein the process/control module controls the environment detecting module to detect the movement value and the brightness index and searches the look-up table to select the compensation mode and the parameters after the process/control module receives the trigger signal.

12. The system for compensating camera movement as claimed in claim 10, wherein the process/control module uses the compensation mode and the parameters to drive the movement compensation modules to capture the external image after the process/control module receives the image-capturing signal.

* * * * *